United States Patent [19]

Burkeen

[11] Patent Number: 4,574,517
[45] Date of Patent: Mar. 11, 1986

[54] DEVICE FOR LANDING BIG FISH ON A LIGHT TEST LEADER

[76] Inventor: Ralph D. Burkeen, 402 Highmoor St., Round Lake Park, Ill. 60073

[21] Appl. No.: 517,660

[22] Filed: Jul. 27, 1983

[51] Int. Cl.⁴ ............................................. A01K 91/00
[52] U.S. Cl. .................................... 43/44.98; 43/43.1; 43/44.88
[58] Field of Search ................. 43/42.72, 44.88, 44.91, 43/44.95, 44.98, 44.87, 44.92, 43.1

[56] References Cited

U.S. PATENT DOCUMENTS 1,296,057  3/1919  Ellsworth ........................... 43/42.72
4,514,427  5/1985  Fukemoto ........................... 43/44.98

Primary Examiner—Nicholas P. Godici
Assistant Examiner—Chris McKee

[57] ABSTRACT

A light weight leader used for fishing is switched automatically to a heavy line when a large fish is hooked. Thus a connector link of the length of the leader has a heavy fishing line attached to one end and a detent mechanism for receiving the hook at the other to thereby replace the leader. A friction pad holding the heavy line in a loop for extending the leader from the other end of the connector permits the line to be cast and used for small fish with the light leader but gives way to the tension when a big fish is hooked and lets the hook be detented into the connector element for landing with the heavy fishing line.

3 Claims, 6 Drawing Figures

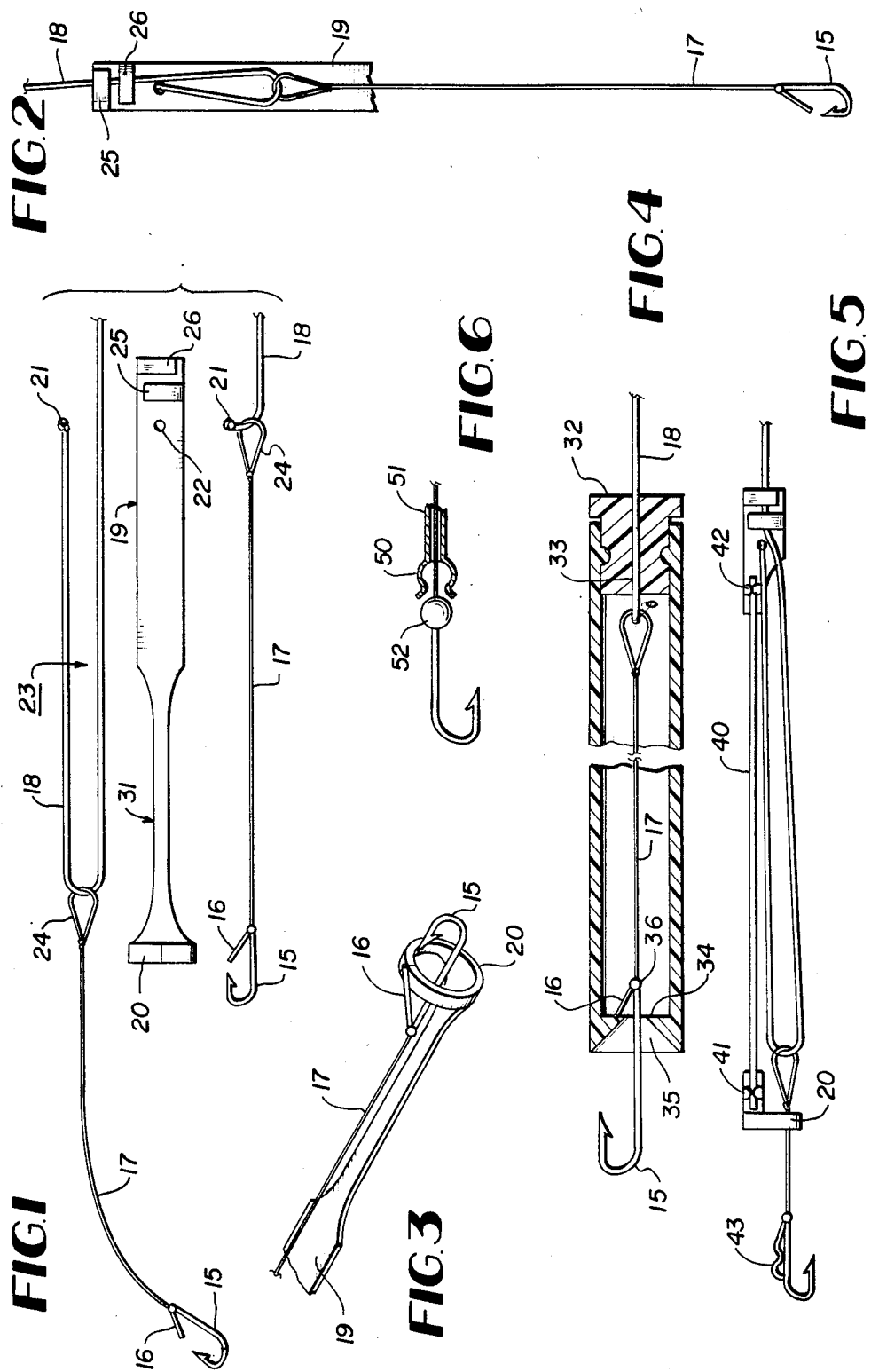

DEVICE FOR LANDING BIG FISH ON A LIGHT TEST LEADER

TECHNICAL FIELD

This invention relates to fishing tackle and more particularly it relates to rig assemblies for connection between the hook and fishing line.

BACKGROUND ART

There are two basic requirements for catching game fish or for getting fish to bite when they are not feeding or hungry. One is to have bait such as a fish worm behave naturally in the water in response to currents and water movement. Another is to have the bait look natural. That is it should not be attached to a highly visible line.

These two requirements can be met by using a very light test leader (perhaps two pound test) between the line and the hook. However, if a large fish is hooked, the light test leader will break, and the big ones thus get away or don't get hooked because of a heavy leader that makes bait behave unnaturally and which presents an unnatural look to the fish.

There is no known rig assembly in the art that can permit fishing with a light test leader and converting it to a heavy test leader when a fish is hooked, so that big fish can be caught. One U.S. Pat. No. 1,296,057—Mar. 4, 1919 to W. Ellsworth does provide in a line a shock absorber that will absorb the initial impact of the strike tension to prevent a light line from breaking.

DISCLOSURE OF THE INVENTION

In accordance with this invention, a connector link is coupled between the hook carried by a light leader and a heavy test line to increase the hook-to-line test strength when a tension exceeding the test weight of the light leader is exceeded, such as when a large fish is hooked.

Thus, the connector link has a heavy line connected to one end thereof so that the line may be looped alongside the connector length with the leader loop riding on the line loop. The light test leader and hook extends through a mouthlike orifice at the other end of the connector link to act naturally in the water and to be substantially invisible.

A detent mechanism connects the hook and link as the line force is such to pull out the line loop against a friction force less than the leader test weight to put the connector link in parallel with the light leader and significantly increase the line to hook test weight. The connector link may be a piece of heavy line, a hollow tube or a longitudinal metal strip, provided it has on one end the detent mouth, and a line connection and friction member on the other end.

BRIEF DESCRIPTION OF THE DRAWINGS

In the drawings:

FIG. 1 is an exploded sketch in perspective of a disassembled rig of this invention showing two different operating conditions, namely as rigged for fishing and as provided by this invention for landing large fish with the light test weight leader;

FIGS. 2 and 3 are partial end views of the connector link positioned between the fishing line and leader as shown in FIG. 1;

FIG. 4 is a broken away cross section view of a further embodiment of the invention employing a hollow tube as a connecting link between the fishing line and leader;

FIG. 5 is a plan view sketch of still another embodiment of the invention employing a flexible line connecting link between the fishing line and leader; and FIG. 6 is a side view sketch of a further embodiment of a detent mechanism as employed by the invention.

THE PREFERRED EMBODIMENT

As may be seen from FIGS. 1 to 3, the fishing rig afforded by this invention has four basic interacting parts, namely: a fish hook 15 with a detent member 16, a leader 17 of light test weight line for giving good bait action and low visibility, a heavy test weight fishing line 18 and a connector link 19 connected to the line 18 at one end and positioned between the line 18 and the hook 15. This hook 15 and detent 16 is generally of the type used as a weedless hook with a flexible spring finger 16 extending back from the hook eye.

The exploded view shows the line 18 and leader 17 alongside the connector element 19 for clarity. In the fishing position of the upper view, the light weight leader 17 extends through the eyelet mouth 20 on the connector element substantially the entire leader length, which corresponds in length to the length of the connector element 19. Thus the heavy line 18 is attached 21 to one end of the connector link at hole 22. It may thus form the loop 23 substantially coextensive with the length of the connector link 19. The end loop 24 of the leader is threaded over heavy line 18 to ride thereon.

In the lower position, the heavy line 18 is pulled by tension between the line 18 and hook 15 great enough to overcome a holding friction introduced in this embodiment by bent over spring clips 25, 26 holding the heavy line 18 against the typically spring brass stock of connector element 19. The friction thus provides a force less than the test weight of the light leader line so as not to break the leader before engaging heavy line. Typically the test weight of the heavy fishing line 18 is twenty pounds, the test weight of the leader 17 is two pounds and the friction force to be overcome is one pound.

Thus, when a larger fish is hooked a tension in the fishing line 18 will slide the line through the friction pads 25, 26 through which the line is threaded and pull the leader 17 into the lower shown position alongside the connection link 19 by sliding on the loop 23 until the line 18 is taut. As seen better in FIG. 3, then the fish hook 15 is detented into the eyelet mouth 20 by means of spring barb 16 and the connector link is substituted for the light weight leader so that a twenty pound pull can be sustained and a large fish landed. The object of this invention therefore is to fish with a light test leader to attract fish and then if a large fish is hooked to replace the light test leader with a stronger connector link for landing the large fish.

As may be seen from FIG. 4, the connector link may have a hollow tube 30 configuration, preferably of plastic. It is seen that the connector link of FIG. 1 has a reduced width section 31 for flexibility desirable when playing the fish. A plastic tube 30 can afford this degree of flexibility.

The friction member in this case is a rubberlike grommet 32 in the end of tube 30 with a slit 33 therein for receiving and clamping line 18. The detent mechanism for receiving the flexible barb 16 is a ridge member 34 forming a mouthway 35. The mouthway in any embodiment is preferably tapered to receive hook eye 36 and slightly larger to let the flexible barb 16 enter and snap into the detent position shown when it fully enters the tube mouth.

The connector link, as shown in FIG. 5, can simply be a length of very heavy nylon line 40 upon which end members such as shown in FIGS. 2 and 3 are crimped at 41, 42. The detent mechanism on the hook is shown as a generally U shaped spring wire 43 with a central detent groove to register in the mouth ring 20.

FIG. 6 shows another detent version, with a spring clip 50 at the end of a tubing 51 for spreading to receive therein a ball like hook loop 52. It is evident that the disclosure of this invention will lead others to variations that do not depart from the spirit or scope of this invention.

Those novel features believed descriptive of the nature of the invention are defined with particularity in the claims.

I claim:

1. In a fish hook rig assembly having a heavy line coupled to a light leader carrying a fishing hook with a mechanism for increasing the hook to line test strength of the leader in response to the weight of a fish, the improvement comprising, a connector link assembly comprising a hollow tube of a length corresponding to the leader, attached within said tube near one end to one end, of the heavy line, friction means substantially closing said one end of said tube for continuously frictionally holding the line to permit a loop to be held in the heavy line within the connector link along its length with a frictional force that is overcome by said weight of a fish to allow said heavy line to slip within said friction means to move the connector link from an initial inactive position to a final reinforcing position, a leader connection loop in the leader end remote from the hook, threaded over the heavy line to ride on its loop and thereby permit the leader to move back and forth within the connector link in response to the varying length of the heavy line loop within the link, and means detenting the hook and connector link together when the heavy line loop is pulled through the friction means to move the shank portion of the hook into the connector link.

2. The rig defined in claim 1 wherein the friction means comprises a rubber like grommet for frictionally engaging the line.

3. The rig assembly as defined in claim 1 wherein the detent means comprises a barb on said hook and means on said connector link for engaging said hook.

* * * * *